(12) United States Patent
Lee et al.

(10) Patent No.: US 7,927,276 B2
(45) Date of Patent: *Apr. 19, 2011

(54) APPARATUS AND METHOD FOR FORMING AN ULTRASOUND IMAGE

(75) Inventors: Jae Keun Lee, Seoul (KR); Chi Young Ahn, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 880 days.

This patent is subject to a terminal disclaimer.

(21) Appl. No.: 11/759,596

(22) Filed: Jun. 7, 2007

(65) Prior Publication Data
US 2008/0077009 A1    Mar. 27, 2008

(30) Foreign Application Priority Data
Sep. 26, 2006   (KR) .................. 10-2006-0093474

(51) Int. Cl.
*A61B 8/00* (2006.01)
(52) U.S. Cl. ........................... 600/437; 600/407
(58) Field of Classification Search .......... 600/407, 600/437, 443, 444, 447
See application file for complete search history.

(56) References Cited

U.S. PATENT DOCUMENTS

| | | | | |
|---|---|---|---|---|
| 4,159,462 A * | 6/1979 | Rocha et al. | ........... | 367/97 |
| 4,991,589 A * | 2/1991 | Hongo et al. | ........... | 600/455 |
| 5,235,986 A | 8/1993 | Maslak et al. | | |
| 5,261,408 A * | 11/1993 | Maslak et al. | ........... | 600/447 |
| 6,128,416 A * | 10/2000 | Oura | ........... | 382/284 |
| 6,814,701 B1 | 11/2004 | Tamura | | |
| 2004/0054284 A1 | 3/2004 | Cai et al. | | |
| 2004/0225218 A1 | 11/2004 | Guracar et al. | | |

FOREIGN PATENT DOCUMENTS
| | | |
|---|---|---|
| KR | 2005-13604 | 2/2005 |
| WO | WO 2004/001447 A1 | 12/2003 |
| WO | WO 2005/024462 A1 | 3/2005 |

OTHER PUBLICATIONS

U.S. Appl. No. 11/759,703, filed Jun. 7, 2007, Lee et al.

* cited by examiner

*Primary Examiner* — Tse Chen
*Assistant Examiner* — Joel F Brutus
(74) *Attorney, Agent, or Firm* — Oblon, Spivak, McClelland, Maier & Neustadt, L.L.P.

(57) ABSTRACT

Embodiments of the invention may provide an apparatus and method for forming an ultrasound image, wherein an ultrasound signal is transmitted and received along a scan line determined based on a virtual common point at each of a plurality of transducers.

In accordance with an embodiment of the present invention, the image frames (as many as desired) for forming a composite image may be obtained, thereby ultimately causing the quality of the ultrasound image to be enhanced.

4 Claims, 6 Drawing Sheets

APPARATUS AND METHOD FOR FORMING AN ULTRASOUND IMAGE

The present application claims priority from Korean Patent Application No. 10-2006-0093474 filed on Sep. 26, 2006, the entire subject matter of which is incorporated herein by reference.

BACKGROUND

1. Field

The present invention generally relates to ultrasound image processing, and more particularly to an apparatus and method for forming an ultrasound image.

2. Background

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional diagnostic images of internal features of an object.

Generally, the ultrasound system includes a plurality of transducers for transmitting and receiving a wide band ultrasound signal. When a transducer is stimulated electrically, an ultrasound signal is generated and transferred to the object. The ultrasound signal is reflected from the object, wherein the reflected ultrasound echo signal is transferred to the transducer and converted to an electric signal. The converted electric signal is amplified and signal-processed to generate an ultrasound image data.

In the ultrasound system, a plurality of image frames according to a plurality of viewpoints or angles can be combined spatially to form a composite image. FIG. 1 is a diagram showing the conventional scan lines of a plurality of image frames for forming a composite image. As shown in FIG. 1, the ultrasound signal is transmitted and received in 3 observational directions via a plurality of transducers $T_1$-$T_N$ to obtain 3 frames 21-23. The obtained frames 21-23 are then combined spatially to form a composite image 24, as shown in FIG. 2. Specifically, the ultrasound signal is transmitted and received along a reference scan line group $S_{R1}$-$S_{RN}$ via the transducers $T_1$-$T_N$ to obtain a reference frame 21. The ultrasound signal is transmitted and received along a first scan line group $S_{A1}$-$S_{AN}$, wherein each scan line is steered to each scan line of the reference scan line group $S_{R1}$-$S_{RN}$ by a predetermined angle $+\Theta$, via the transducers $T_1$-$T_N$ to obtain a first frame 22. The ultrasound signal is transmitted and received along a second scan line group $S_{B1}$-$S_{BN}$, wherein each scan line is steered to each scan line of the reference scan line group $S_{R1}$-$S_{RN}$ by a predetermined angle $-\Theta$, via the transducers $T_1$-$T_N$ to obtain a second frame 23. In the ultrasound system, a spatially overlapped area A between the obtained reference frame 21 and the first frame 22, a spatially overlapped area B between the reference frame 21 and the second frame 23, as well as the reference frame 21, are combined to form the composite image 24.

However, the conventional ultrasound system has drawbacks in that the number of image frames necessary for forming a composite image is limited since an odd number of image frames are used to form a composite image.

Moreover, the conventional ultrasound system has a problem of degrading the quality of the composite image, as shown in FIG. 2. That is, the boundary line $S_{AN}$ of the first frame 22 and the boundary line $S_{B1}$ of the second frame 23 are shown in the composite image 24. This is because the spatially overlapped area A between the reference frame 21 and the first frame 22, the spatially overlapped area B between the reference frame 21 and the second frame 23, as well as the reference frame 21, are combined.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
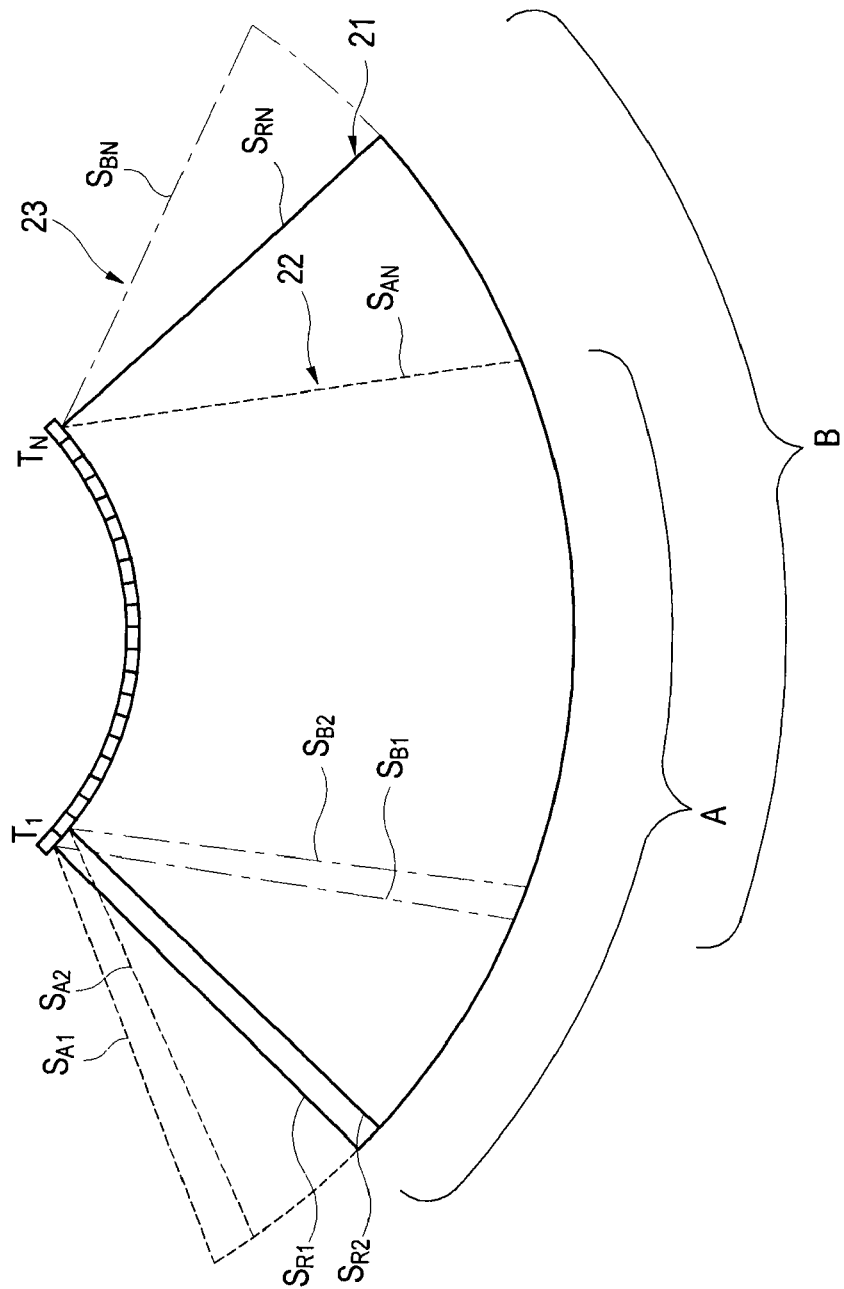
FIG. 1 is a diagram showing the conventional scan lines of a plurality of image frames for forming a composite image.
Figure 2:
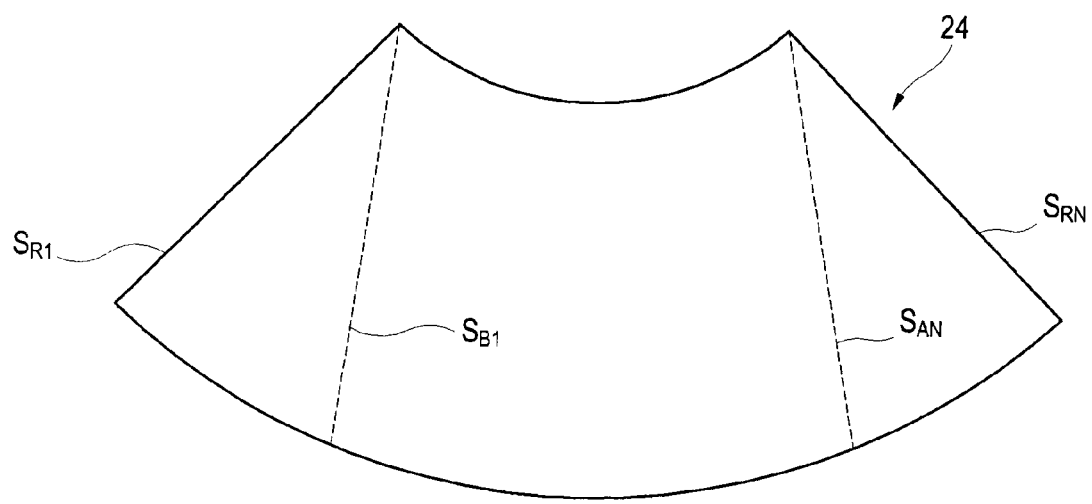
FIG. 2 is a diagram showing a composite image formed by combining a plurality of image frames.
Figure 3:
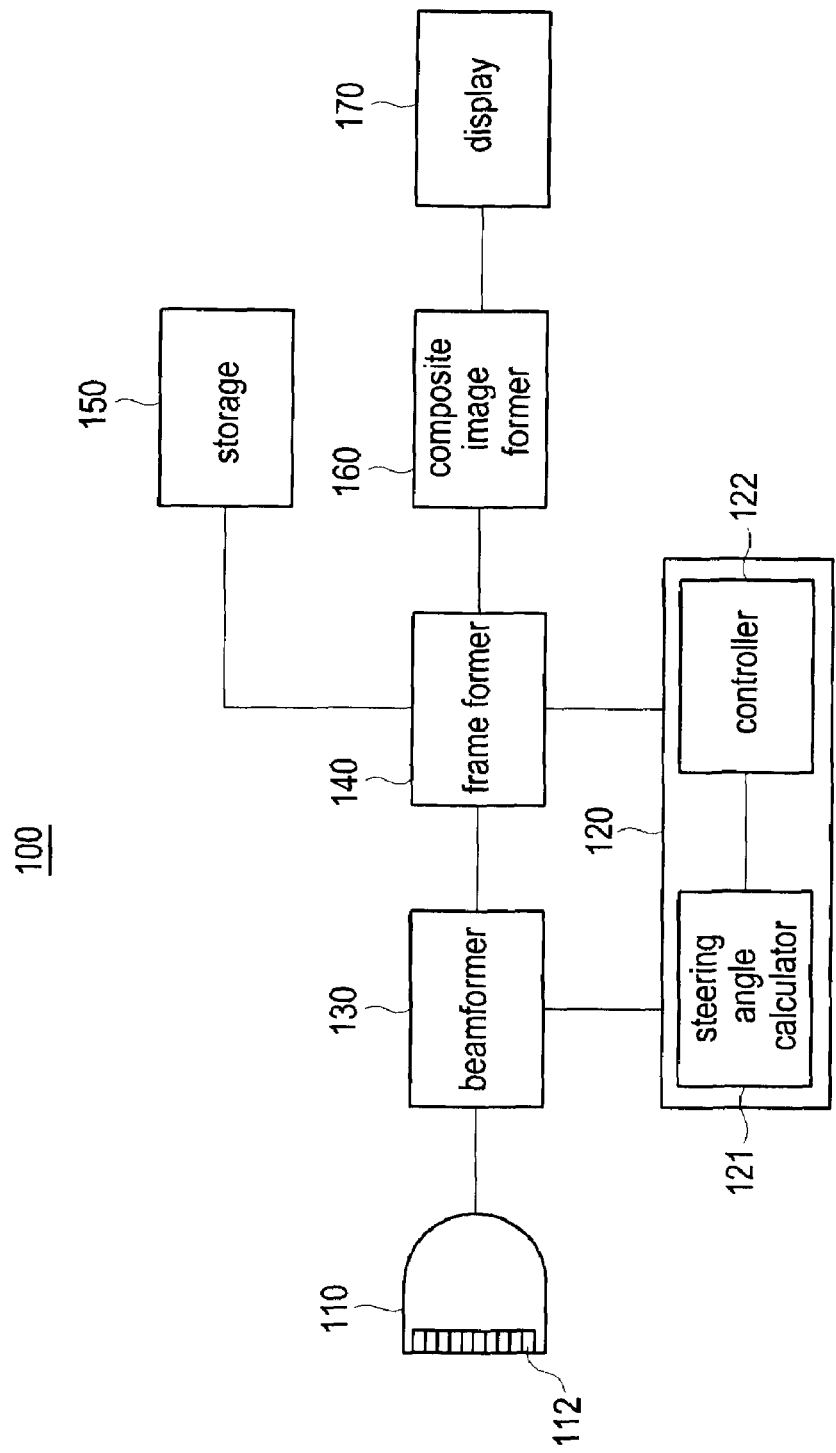
FIG. 3 is a block diagram showing an ultrasound system constructed in accordance with an embodiment of the invention.

FIG. 3 is a schematic diagram showing an ultrasound system constructed in accordance with an embodiment of the invention. As shown in FIG. 3, the ultrasound system 100 may include a probe 110, a scan line setter 120, a beamformer 130, a frame former 140, a storage 150, a composite image former 160 and a display 170. The frame former 140 and the composite image former 160 may be implemented in a processor.

The probe 110 may include a transducer array 112 comprising a plurality of transducers. The probe 110 may transmit ultrasound signals to a target along scan lines and receive reflected ultrasound signals from the target. In one embodiment, the probe 110 may include a curved linear probe.

The scan line setter 120 may include a steering angle calculator 121 and a controller 122, as shown in FIG. 3. The steering angle calculator 121 may set a plurality of virtual common points based on a common point, on which extended reference scan lines for the transducers are concentrated. The steering angle calculator 121 may calculate a steering angle of a scan line for each of the transducers based on a plurality of the virtual common points.

Figure 4:
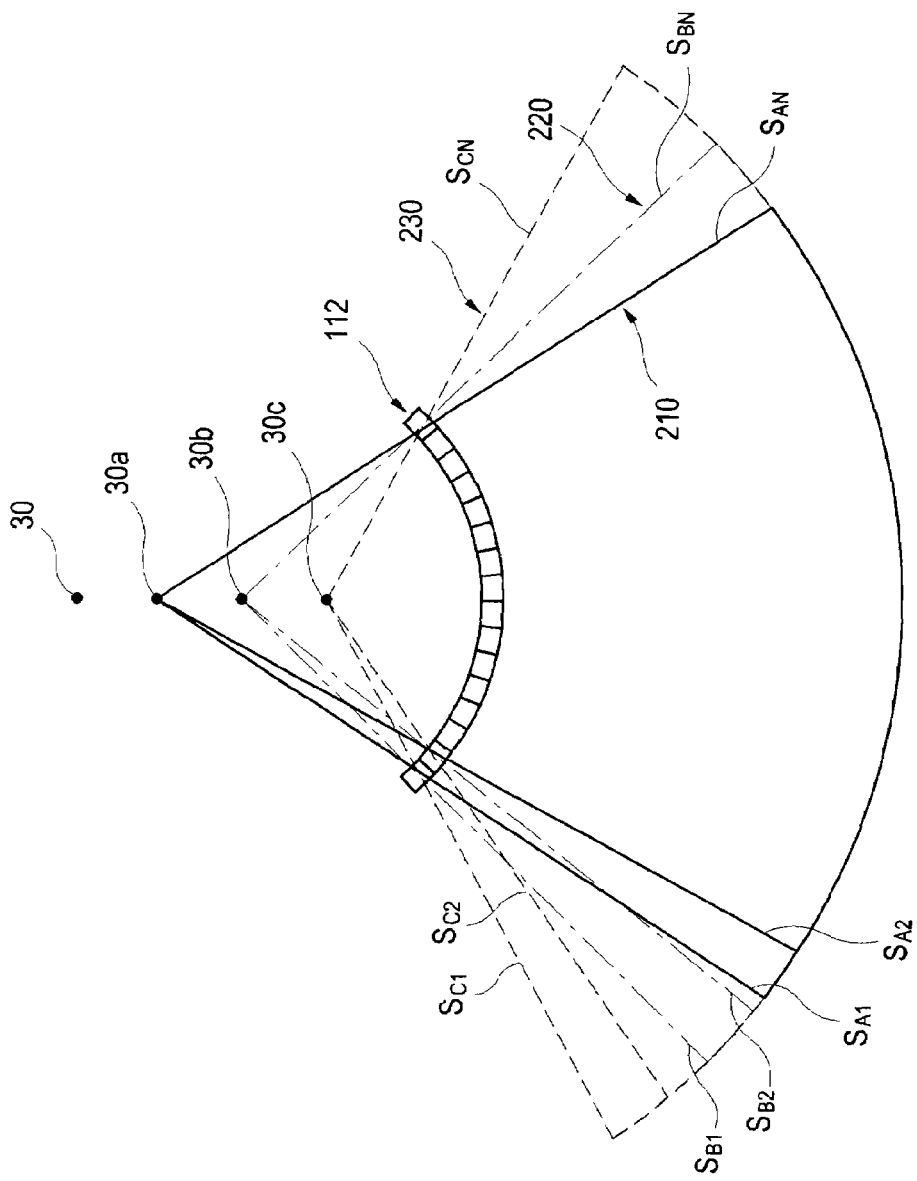
FIG. 4 is a diagram showing an example of scan lines of image frames for forming a composite image in accordance with an embodiment of the invention.

FIG. 4 is a diagram showing an example of scan lines of image frames for forming a composite image in accordance with an embodiment of the invention. In one embodiment, the steering angle calculator 121 may set first to third virtual common points 30a-30c based on a common point 30, on which the extended reference scan lines for the transducers $T_1$-$T_n$ are concentrated. As shown in FIG. 4, the virtual common points 30a-30c are set by moving the common point 30 to the transducer array 112. The steering angle calculator 121 may set the first virtual common point 30a to a virtual common point corresponding to a first scan line group $S_{A1}$-$S_{AN}$ for obtaining a first frame 210. The steering angle calculator 121 may set the second virtual common point 30b to a virtual common point corresponding to a second scan line group $S_{B1}$-$S_{BN}$ for obtaining a second frame 220. The steering angle calculator 121 may set the third virtual common point 30c to a virtual common point corresponding to a third scan line group $S_{C1}$-$S_{CN}$ for obtaining a third frame 230. The steering angle calculator 121 may calculate steering angles of the first scan group $S_{A1}$-$S_{AN}$ based on the first virtual common point 30a. The steering angle calculator 121 may calculate steering angles of the second scan group $S_{B1}$-$S_{BN}$ based on the second virtual common point 30b. The steering angle calculator 121 may calculate steering angles of the third scan group $S_{C1}$-$S_{CN}$ based on the third virtual common point 30c. Although three scan lines of each scan line group are depicted in FIG. 4, a skilled person in the art should understand that it is only an example for illustrative purposes, and that each scan line group may include an arbitrary number of scan lines.

Although it is described above to set the three virtual common points, the present invention is certainly not limited thereto. The steering angle calculator 121 may set a plurality of virtual common points, e.g., N number of virtual common points, and based on the virtual common points, calculate steering angles of the first scan group $S_{A1}$-$S_{AN}$ for obtaining the first frame data as well as steering angles of the second scan group $S_{B1}$-$S_{BN}$ for obtaining the second frame data. In this way, the steering angles of up to the Nth scan group $S_{N1}$-$S_{NN}$ for obtaining the Nth frame data may be calculated. Although it is described to move the common point vertically in order to set a virtual common point, the present invention is certainly not limited thereto. For example, it is also possible to move the common point horizontally, diagonally or in any direction to the transducer array 112.

As such, according to an embodiment of the present invention, the frames (as many as desired) for forming a composite image may be used since the scan lines along which the ultrasound signals are transmitted/received may be determined based on the virtual common point. Further, a sufficient amount of data necessary for forming a composite image can be obtained since the virtual common points may be set to obtain a plurality of image frames.

The controller 122 may control the transducer array 112 such that the transducer array 112 transmits and receives ultrasound signals along the scan lines, the steering angles of which are changed according to the frame change, in order to obtain a plurality of frames. In one embodiment, the controller 122 may generate a first control signal to control the transducer array 112 based on the steering angles calculated by the steering angle calculator 121. This is so that the transducer array 112 transmits and receives ultrasound signals along the scan lines of the first scan line group $S_{A1}$-$S_{AN}$, along the scan lines of the second scan line group $S_{B1}$-$S_{BN}$, and along the scan lines of the third scan line group $S_{C1}$-$S_{CN}$ for obtaining the first, second and third frames 210, 220 230, respectively, as shown in FIG. 4. The controller 122 may generate a second control signal to form a frame corresponding to each scan line group based on the virtual common points, the steering angles and the data of the scan lines. The controller 122 may further generate a third control signal to form a composite image for a spatially overlapped area in the frames.

In response to the first control signal of the controller 122, the beamformer 130 may delay and add the ultrasound signals transmitted/received along the scan lines of the scan line group corresponding to each frame via the transducers in order to obtain a plurality of frames. In response to the second control signal of the controller 122, the frame former 140 may form a frame corresponding to each scan line group based on the added signal outputted from the beamformer 130. The storage 150 may store the frame of each scan line group outputted from the frame former 140 successively. In response to the third control signal of the controller 122, the composite image former 160 may read a plurality of frames from the storage 150 and form a composite image for a spatially overlapped area in the frames.

Figure 5:
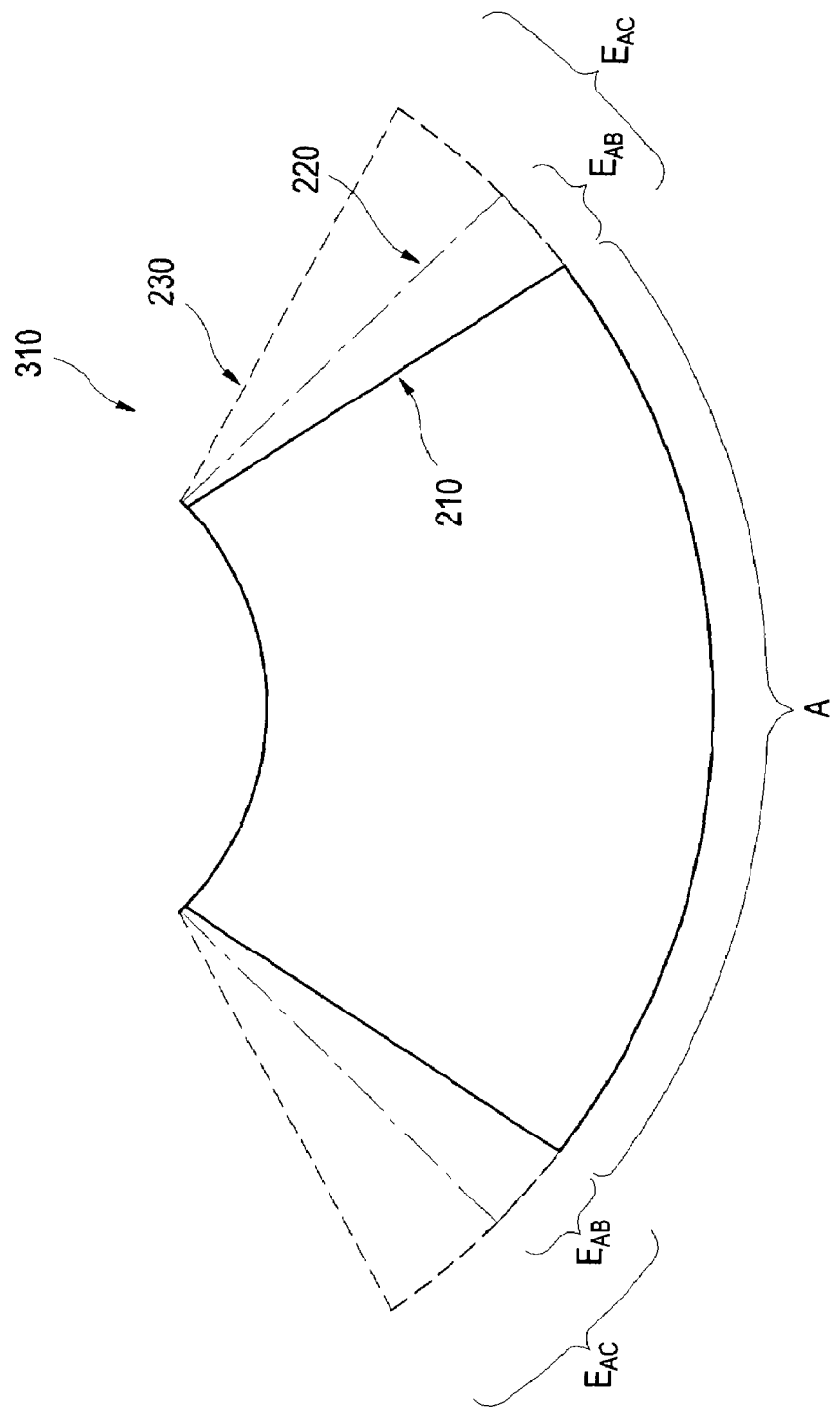
FIG. 5 is a diagram showing an example of a composite image formed by combining a plurality of image frames in accordance with one embodiment of the invention.

In one embodiment, the composite image former 160, in response to the third control signal, may read 3 frames 210-230 from the storage 150. It may then form a composite image 310 for a spatially overlapped area A in the frames 210-230, except a non-overlapped area $E_{AB}$ between the frame 210 and the frame 220, and a non-overlapped area $E_{AC}$ between the frame 210 and the frame 230, as shown in FIG. 5. In one embodiment, the composite image former 160 may calculate an average value for each pixel, e.g., an average intensity of each pixel, in the frames 210-230. In one embodiment, the composite image former 160 may assign a different weight to each frame for combination. For example, the composite image former 160 may assign the greatest weight to a frame 210 corresponding to the virtual common point 30a located most far away from the transducer array 112, the lowest weight to a frame 230 corresponding to the virtual common point 30c located nearest to the transducer array 112, and the intermediate weight to a frame 220 corresponding to the virtual common point 30b for combination.

As such, according to an embodiment of the invention, the quality of the composite image can be enhanced since the image frames are weighted appropriately to form a composite image for a spatially overlapped area. The display 170 may display the composite image formed by the composite image former 160.

Although embodiments have been described with reference to a number of illustrative embodiments thereof, it should be understood that numerous other modifications and embodiments can be devised by those skilled in the art that will fall within the spirit and scope of the principles of this disclosure.

Figure 6:
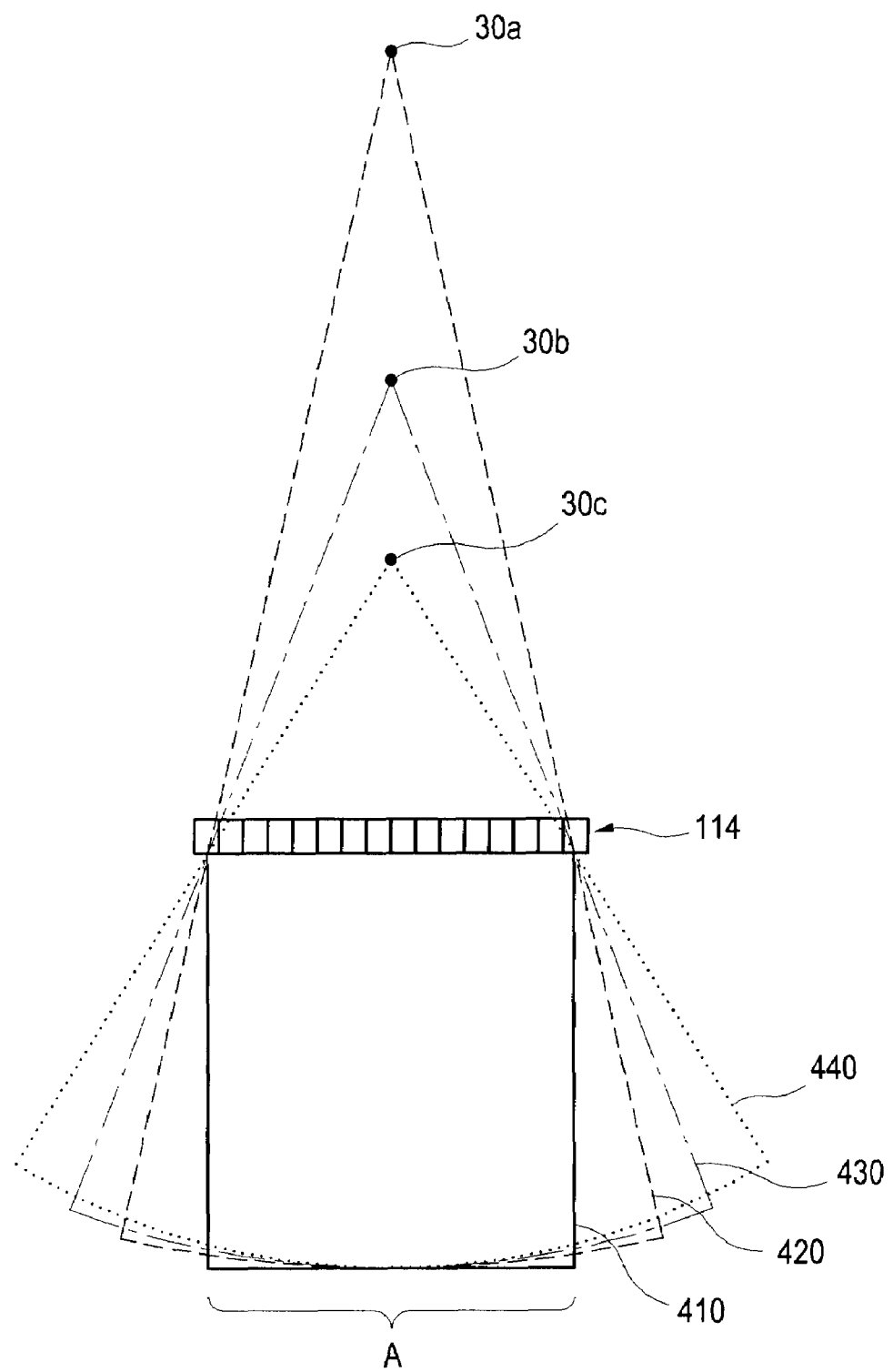
FIG. 6 is a diagram showing an example of scan lines of image frames for forming a composite image in accordance with another embodiment of the invention.

For example, although an embodiment using a curved linear probe as a probe has been described, the present invention is not limited thereto and an embodiment using a linear probe, whose common point is located at infinity and having a plurality of virtual common points, is also possible. In other words, as shown in FIG. 6, the ultrasound system may use a linear probe including a plurality of transducers 114 to form a composite image for a spatially overlapped area A in a frame 410 corresponding to a common point (not shown) located at infinity, a frame 420 corresponding to a virtual common point 30a, a frame 430 corresponding to a virtual common point 30b, and a frame 440 corresponding to a virtual common point 30c.

In accordance with one embodiment of the present invention, there is provided an apparatus for forming an ultrasound image, comprising: a plurality of transducers, each of the transducers being operable to transmit and receive an ultrasound signal along a scan line determined based on a virtual common point.

In the embodiment, the apparatus further comprises a setter to be operable to set a virtual common point based on a common point, wherein extended reference scan lines for a plurality of the transducers are concentrated on the common point. The setter may be operable to calculate a steering angle of a scan line determined based on the virtual common point for each of the transducers, wherein each of the transducers is operable to transmit and receive an ultrasound signal along the scan line based on the steering angle.

In the embodiment, each of the transducers is operable to transmit and receive the ultrasound signal a number f times for a plurality of virtual common points.

In the embodiment, the apparatus further comprises: a frame former to be operable to form an image frame for a virtual common point based on the received ultrasound signals; and a composite image former to be operable to receive a plurality of image frames to form a composite image.

In accordance with another embodiment of the present invention, there is provided a method for forming an ultrasound image, comprising: transmitting and receiving an ultrasound signal along a scan line determined based on a virtual common point at each of a plurality of transducers.

In the embodiment, the method further comprises: setting a virtual common point based on a common point, wherein extended reference scan lines for the transducers are concentrated on the common point; and calculating a steering angle of a scan line determined based on the virtual common point for each transducer, wherein transmitting and receiving the ultrasound signal at each of the transducers includes transmitting and receiving an ultrasound signal along the scan line based on the steering angle at each of the transducers.

In the embodiment, transmitting and receiving the ultrasound signal at each of the transducers includes transmitting and receiving the ultrasound signal a number of times for a plurality of virtual common points at each of the transducers.

In the embodiment, the method further comprises: forming an image frame based on the previously received ultrasound signal during transmitting and receiving the current ultrasound signal; and forming a composite image from a plurality of image frames.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for forming an ultrasound image, comprising:
    a plurality of transducers configured to transmit and receive ultrasound signals along a plurality of scan lines;
    a setter operable to
        set a common point, on which scan lines extended respectively from the plurality of first scan lines towards a back side of the transducers are concentrated;
        move the common point to set a plurality of virtual common points at the back side of the transducers; and
        determine plural groups of scan lines based respectively on the plurality of virtual common points;
    a frame former configured to form a plurality of image frames corresponding respectively to the plural groups of scan lines based on the received ultrasound signals; and
    a composite image former configured to
        receive a plurality of image frames;
        assign a weight to each of the image frames, said weight being determined based on a location of the virtual common point associated with the respective image frame; and
        produce weighed image frames based on the image frames and the weights; and
        to form a composite image for a spatially overlapped area between the weighed image frames.

2. The apparatus of claim 1, wherein the composite image former is further configured to assign a greatest weight to an image frame corresponding to a virtual common point located furthest from the transducers, and to assign a lowest weight to an image frame corresponding to a virtual common point located nearest to the transducers.

3. A method for forming an ultrasound image in an ultrasound system having a plurality of transducers to transmit and receive ultrasound signals along a plurality of scan lines, comprising:
    setting a common point, on which scan lines extended respectively from the plurality of first scan lines towards a back side of the transducers are concentrated;
    moving the common point to set a plurality of virtual common points at the back side of the transducers;
    determining plural groups of scan lines based respectively on the plurality of virtual common points;
    forming a plurality of image frames corresponding respectively to the groups of scan lines based on the received ultrasound signals;
    assigning a weight to each of the image frames, said weight being determined based on a location of the virtual common point associated with the respective image frame;
    producing weighed image frames based on the image frames and the weights; and
    forming a composite image for a spatially overlapped area between the weighed image frames.

4. The method of claim 3, wherein assigning the weights includes assigning a greatest weight to an image frame corresponding to a virtual common point located furthest from the transducers and assigning a lowest weight to an image frame corresponding to a virtual common point located nearest to the transducers.

* * * * *